United States Patent [19]

Iwasawa et al.

[11] Patent Number: 4,497,856

[45] Date of Patent: Feb. 5, 1985

[54] MULTI-LAYERED HOLLOW CONTAINER

[75] Inventors: Nobuyuki Iwasawa, Yokohama; Keiji Kazato, Chiba, both of Japan

[73] Assignee: Toppan Printing Co. Ltd., Japan

[21] Appl. No.: 452,195

[22] Filed: Dec. 22, 1982

[51] Int. Cl.$^3$ .............................................. B65D 11/00
[52] U.S. Cl. .................................. 428/35; 428/421; 428/422; 428/492; 428/516; 428/518; 525/74
[58] Field of Search ............... 428/421, 422, 515, 521, 428/35, 492, 516, 518; 525/74

[56] References Cited

U.S. PATENT DOCUMENTS 4,317,860  3/1982  Strassel .............................. 428/421

FOREIGN PATENT DOCUMENTS 16617  1/1980  European Pat. Off. .
13337  2/1981  Japan .
86748  7/1981  Japan .

Primary Examiner—George F. Lesmes
Assistant Examiner—Pamela R. Schwartz
Attorney, Agent, or Firm—Lerner, David, Littenberg, Krumholz & Mentlik

[57] ABSTRACT

Multi-layered containers are disclosed including an inner layer of a thermoplastic fluorocarbon resin, an outer layer of polyolefin, and an intermediate layer therebetween of a mixture of either polyolefin grafted with an unsaturated glycidyl compound or an ethylene copolymer grafted with an unsaturated glycidyl compound. The containers possess unexpectedly improved properties, including moldability and interlaminar strength, and are excellent candidates for containing agricultural chemicals, fuel oil and industrial chemicals of various types.

5 Claims, No Drawings

MULTI-LAYERED HOLLOW CONTAINER

BACKGROUND OF THE INVENTION

1. Field of the Invention

The present invention relates to a container suitable for containing agricultural chemicals, fuel oil and industrial chemicals.

2. Description of the Prior Art

Heretofore, containers made of polyolefins such as polyethylene or polypropylene have been generally used for holding agricultural chemicals, fuel oil and industrial chemicals such as those of aromatic hydrocarbon series or aliphatic hydrocarbon series. These containers, however, are unsatisfactory because they swell or crack after a certain period of time in view of a poor resistance to chemicals so that they cannot be widely used from the viewpoint of safety.

In order to improve the chemical resistance of these containers, the use of a resin such as nylon having good resistance to organic chemicals has been proposed. Although such attempts to produce hollow containers made solely of nylon have been continuing for a considerable period of time, such containers have not yet been commercialized, because of various disadvantages and difficulties associated therewith such as the high cost of nylon, its poor moldability and drawdown owing to the low molten viscosity, and the low fused adhesion strength of the pinch-off portion in the bottom of such single layer nylon containers leading to an easy separation of the pinch-off portion if the container is dropped.

Therefore, contents such as agricultural chemicals, fuel oil and industrial chemicals have been generally held in metallic cans or glass bottles at the present time. However, disposal of wastes of metallic cans and glass bottles after use thereof has become a social problem. In place of these containers, containers suitable for filling such contents have long been desired.

As an example of a method of coping with those prior art problems is that shown in Japanese Patent Laid-Open Publication No. 53-21675 (1978), in accordance with which the production of a three-layer container having an excellent chemical resistance and moldability by the multi-layer co-extrusion blow molding method has now been developed and put to practical use. This three-layer container comprises an intermediate layer consisting of an adhesive polyolefin, and an inner layer, which is brought into direct contact with liquid contents, consisting of nylon or saponified ethylene-vinyl acetate copolymer having an excellent resistance particularly to organic solvents and so on. These resins, however, do not exhibit an excellent resistance to all liquid contents. For example, nylon is very poor in resistance to phenols, alcohols, strong acids and weak acids. The saponified ethylene-vinyl acetate copolymers have the defect that they do not have a sufficient resistance to solvents having a hydroxyl group as in the case of nylon. Metals are inappropriate for acids, and glass is inappropriate for alkaline hydrates.

A fluorocarbon resin is generally known as a material exhibiting an excellent resistance to all chemicals. The fluorocarbon resin is generally excellent in chemical resistance and has no water absorption properties, and its abrasion resistance, self lubrication and non-tackiness are the best among synthetic resins. Tetrafluoroethylene resin (hereinafter referred to as TFE) is the most well known of the fluorocarbon resins. TFE has the lowest chemical activity possible as a fluorine-containing polymer, and the lowest friction, non-tackiness, best dielectric performance, minimum water absorption, highest resistance to high and low temperatures and best weathering property among the fluorocarbon resins. However, TFE does not have a plasticity which permits it to be molten at its melting point, so that its processability is extremely poor. Accordingly, it is processed according to a method similar to that adopted in the field of powder metallurgy, and its use is therefore limited.

Thermoplastic fluorocarbon resin which are extrusion moldable may include ethylene-tetrafluoroethylene alternating copolymer resin (hereinafter referred to as ETFE), polyvinylidene fluoride resin (PVDF), polyvinyl fluoride resin (PVF), ethylene-ethylene chloride trifluoride alternating copolymer resin (ECTFE), polyethylene chloride trifluoride resin (PCTFE) and tetrafluoroethylene-hexafluoroethylene alternating copolymer resin (FEP). These resins contain fluorine atoms in their molecular segments so that they exhibit properties similar to those of TFE. Although the fluorocarbon resins have favorable properties, they are very expensive, so that their use is restricted to some special fields.

The thermoplastic fluorocarbon resins also have difficulty in laminating with other resins because they generally have significant non-tackiness.

In order to overcome these defects, we have disclosed in our copending Japanese Patent Laid-Open Publication No. 56-13337 (1981) a multi-layer co-extrusion blow molding method adapted to produce a container having a favorable chemical resistance, water-vaporproof, interlaminar strength and economy in production, the container comprising an inner layer made of a thermoplastic fluorocarbon resin, an intermediate layer made of a polyolefin grafted with an unsaturated glycidyl compound, and an outer layer made of a polyolefin. This method, however, has the defect that it has a poor co-extrusion blow moldability although the interlaminar strength is satisfactory. In this method, the fluorocarbon resin to be used as the inner layer has a high molding temperature ranging from 250° to 350° C., so that the molten viscosity of the unsaturated glycidyl graft-modified polyolefin as the intermediate layer to be extruded as a laminate with the fluorocarbon resin decreases remarkably, leading to irregularities in the wall thickness of the inner and intermediate layers in the circumferential direction of the resulting container. In some extreme cases, the graft-modified polyolefin for the intermediate layer cannot be filled to form a full intermediate layer, resulting in a container wherein the thermoplastic fluorocarbon resin and the polyolefin are locally separate from each other.

SUMMARY OF THE INVENTION

The present invention has been made in consideration of the above drawbacks and has for its object to provide a multi-layered hollow container capable of being formed in an economical and cheap manner by the multi-layer co-extrusion blow molding method using the thermoplastic fluorocarbon resin having a good co-extrusion blow moldability, chemical resistance, water-vaporproof and interlaminar strength.

In accordance with the present invention it has now been discovered that these and other objects can be accomplished by providing a multi-layered container comprising an inner layer, an outer layer, and an intermediate layer therebetween in which the inner layer comprises a thermoplastic fluorocarbon resin, the outer layer comprises a polyolefin, and the intermediate layer comprises a mixture of a polyolefin and either a polyolefin grafted with an unsaturated glycidyl compound or an ethylene copolymer grafted with an unsaturated glycidyl compound. In a preferred embodiment, the intermediate layer includes from about 30 to 80 percent by weight of the polyolefin and from about 10 to 50 percent by weight of the polyolefin or ethylene copolymer grafted with an unsaturated glycidyl compound.

In accordance with a preferred embodiment of the multi-layered container of the present invention, the inner layer comprises a thermoplastic fluorocarbon resin, preferably one such as ETFE.

In accordance with a preferred embodiment of the multi-layered container of the present invention, the intermediate layer includes an elastomer or gum rubber compound, preferably an ethylene-propylene rubber or an ethylene-propylene terpolymer.

DETAILED DESCRIPTION OF THE PREFERRED EMBODIMENTS

The multi-layered hollow container according to the present invention consists mainly of an inner layer made of a thermoplastic fluorocarbon resin, an intermediate layer made of a mixed resin of 80 to 30% by weight of a polyolefin grafted with an unsaturated glycidyl compound, 35 to 5% by weight of a gum rubber and 50 to 10% by weight of a polyolefin; and an outer layer made of a polyolefin.

The intermediate layer may preferably be made of a mixed resin of 65 to 50% by weight of ethylene-vinyl acetate copolymer graft-modified with an unsaturated glycidyl compound, 25 to 15% by weight of a gum rubber and 30 to 20% by weight of a polyolefin.

The fluorocarbon resin to be used for the inner layer of the multi-layered hollow container according to the present invention may include, for example, ETFE, PVDF, PVF, ECTFE, PCTFE and FEP. Among these fluorocarbon resins, ETFE, PVDF and FEP are preferred from a viewpoint of molding processability. Further, ETFE is most suitable for accomplishing the objects of the present invention because it has a high resistance to solvents.

In accordance with the present invention, the polyolefin to be used as the outer layer of the container may include, for example, high, medium and low density polyethylene, polypropylene and ethylene-propylene copolymer.

When the polyolefin is mixed with an inorganic filler and a fiber, a thermal resistance, flammability and mechanical strength are improved.

The amount of the inorganic filler or fiber to be used in accordance with the present invention may range from 5 to 90% by weight with respect to 10 to 95% by weight of the polyolefin, preferably from 20 to 60% by weight with respect to 40 to 80% by weight of the polyolefin. The inorganic filler may include, for example, calcium carbonate, aluminum hydroxide, calcium sulfite, talc, gypsum and mica. The fiber may include, for example, an inorganic fiber, an organic fiber and carbon fiber. Among these fibers, glass fibers are preferred in terms of cost and properties. The average lengths of the glass fibers are in the range from 0.05 to 30 mm, preferably from 0.2 to 15 mm.

The polyolefin graft-modified with the unsaturated glycidyl compound to be used for the intermediate layer according to the present invention may firmly adhere the fluorocarbon resin and the polyolefin together as illustrated hereinabove.

The unsaturated glycidyl compounds may include, for example, glycidyl methacrylate and glycidyl acrylate. These compounds have the following chemical structures:

glycidyl methacrylate:

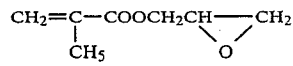

glycidyl acrylate:

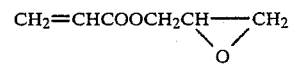

The modified polyolefin may be a graft polymer prepared, for example, by mixing polyethylene, polypropylene or a copolymer thereof or an ethylene-vinyl acetate copolymer with the unsaturated glycidyl compound as described hereinabove and then subjecting the resulting mixture to radioactive radiation or a reaction in the presence of a peroxide catalyst. The graft-polymerizable polyolefin may include, for example, polyethylene, polypropylene or a copolymer thereof or an ethylene-vinyl acetate copolymer as illustrated hereinabove. Among these polyolefins, an ethylene-vinyl acetate copolymer is preferred in terms of graft polymerization.

The gum rubber has the great effect of improving the molten viscosity of the unsaturated glycidyl graft-modified polyolefin, particularly the unsaturated glycidyl graft-modified ethylene-vinyl acetate copolymer, and may not decrease the interlaminar strength between the thermoplastic fluorocarbon resin and the polyolefin. The addition of the gum rubber, however, may cause melt fractures of a multi-layered molten parison leading to irregularities in the wall thicknesses of the intermediate layer and the inner layer. In order to improve this property, the polyolefin as illustrated hereinafter is added. With increasing amounts of the polyolefin, moldability and uniformity in wall thickness of the intermediate layer and the inner layer may be improved; however, interlaminar strength decreases to a remarkable extent. Accordingly, the amounts of the gum rubber are preferably within the range as defined hereinabove.

The gum rubber may include, for example, natural rubber, styrene-butadiene rubber, acrylonitrile-butadiene rubber, butyl rubber, chloroprene type synthetic rubber, acryl rubber, urethane rubber, polybutadiene rubber, ethylene-propylene rubber, ethylene-propylene terpolymer, polyether rubber, polybutene-1 rubber and ethylene-butadiene rubber. Among these gum rubbers, ethylene-propylene rubber and ethylene-propylene terpolymer are desirable in terms of compatibility with the unsaturated glycidyl graft-modified ethylene-vinyl acetate copolymer or the polyolefin, moldability and cost.

The polyolefin to be used for the intermediate layer of the container according to the present invention may include, for example, α-olefin homopolymer such as polyethylene or polypropylene, a copolymer of ethylene with other α-olefin such as an ethylene-propylene copolymer, ethylene-butene-1 copolymer or ethylene-hexane-1 copolymer or a crystalline polymer of α-oleins such as propylene-butene-1. These polymers and copolymers may be blended with each other. A high density polyethylene having a low melt index may be preferably used in terms of compatibility with the gum rubber and the unsaturated glycidyl graft-modified ethylene-vinyl acetate copolymer, the effect of decreasing a molten viscosity, and cost.

The three-layer hollow container according to the present invention may be molded by conventional multi-layer extrusion blow molding method. It is economical to prepare the container so that it has a thin inner layer made of the fluorocarbon resin and a thick outer layer made of general-purpose polyolefin.

With the hollow container formed as having the structure as described hereinabove, the present invention can provide the multi-layered hollow container having an excellent chemical resistance obtainable at a cheaper cost than conventional ones and without causing the fluorocarbon resin to lose its properties as well as having excellent co-extrusion blow moldability and interlaminar strength due to the use of the resin mixture of the unsaturated glycidyl graft-modified polyolefin with the gum rubber and the polyolefin as the intermediate layer between the inner layer made of the fluorocarbon resin and the outer layer made of the polyolefin. With high density polyethylene, a container suitable for containing chemicals having an excellent impact resistance may be provided. The use of polypropylene may provide a container for containing medicines and drugs which may be sterilizable by heat.

EXAMPLE 1

Using high density polyethylene (HDPE) having a density of 0.95 and a melt index of 0.3 as the outer layer, a resin mixture of 45% by weight of graft polymer obtained by grafting an ethylene-vinyl acetate copolymer having a density of 0.94 and a melt index of 1.8 with glycidyl methacrylate with 20% by weight of ethylene-propylene terpolymer (ethylene content: 70%; propylene content: 15%; and ethylidenenorbornene content: 15%) and 35% by weight of high density polyethylene having a density of 0.955 and a melt index of 0.05 as the intermediate layer, and ethylene-tetra-fluoroethylene alternating copolymer resin (ETFE) having a melting point of 270° C. and a molten viscosity ranging from $10^4$ to $10^5$ at temperatures ranging from 300° to 330° C. as an inner layer, a three-layer hollow container having a weight of 45 grams and an inner content of 500 cc was prepared by the multi-layer co-extrusion blow molding machine. The outer layer/intermediate layer/inner layer ratio in wall thickness was found to be 7/1/2.

EXAMPLE 2

A three-layer hollow container was prepared by using the same materials and following the same procedures as in Example 1 with the exception that a resin mixture of 55% by weight of an ethylene-vinyl acetate copolymer having a density of 0.94 and a melt index of 1.8 grafted with glycidyl methacrylate with 25% by weight of an ethylene-propylene terpolymer (ethylene content: 70%; propylene content: 15%; and ethylidenenorbornene content: 15%) and 20% by weight of high density polyethylene having a density of 0.955 and a melt index of 0.05 was used for the intermediate layer.

EXAMPLE 3

A three-layer hollow container having a weight of 45 grams and an inner content of 500 cc was prepared by using the same materials and following the same procedures as in Example 1 with the exception that a blend of 70% by weight of HDPE of Example 1 with 30% by weight of glass fibers having an average length of 10 mm was used for the outer layer. The outer/intermediate/inner layer ratio in wall thickness was found to be 7/1/2.

COMPARATIVE EXAMPLE 1

A three-layer hollow container was prepared by using the same materials and following the same procedures as in Example 1 with the exception that an ethylene-vinyl acetate copolymer having a density of 0.94 and a melt index of 1.8 grafted with glycidyl methacrylate was used as the intermediate layer. This three-layer container was found to be remarkably irregular in wall thickness in the inner layer and the intermediate layer, and some portions of the intermediate layer were deficient so that its commercial value was found to be insufficient.

COMPARATIVE EXAMPLE 2

A three-layer hollow container was prepared in the same manner as in Example 1 with the exception that a mixture of 70% by weight of an ethylene-vinyl acetate copolymer having a density of 0.94 and a melt index of 1.8 grafted with glycidyl methacrylate and 30% by weight of an ethylene-propylene terpolymer (ethylene content: 70%; propylene content: 15%; and ethylidenenorbornene content: 15%) was used for the intermediate layer. This three-layer molten parison caused melt fractures and led to irregularities in wall thickness.

The interlaminar or adhesion strength and moldability of the containers are shown in a table below.

|  | Adhesion strength*[1] (g/15 mm width) | Moldability*[2] |
| --- | --- | --- |
| Example 1 | 200–300 | ⊚ |
| Example 2 | 500–700 | ○ |
| Example 3 | 200–300 | ⊚ |
| Comparative Example 1 | 700–800 | x |
| Comparative Example 2 | 700–800 | x |

*[1] 90° peeling (interlaminar strength between the inner and intermediate layers)
*[2] Moldability:
⊚ Excellent
○ Good
x Remarkably poor

What is claimed is:

1. A multi-layered container comprising an inner layer, an outer layer, and an intermediate layer therebetween, said inner layer comprising a thermoplastic ethylene-tetrafluoroethylene alternating copolymer resin, said outer layer comprising a polyolefin, and said intermediate layer comprising from about 30 to about 80% by weight of ethylene-vinyl acetate copolymer graft-modified with an unsaturated glycidyl compound, from about 5 to about 35% by weight of a gum rubber compound, and from about 10 to about 50% by weight of a polyolefin.

2. The multi-layered container of claim 1, wherein said gum rubber compound is selected from the group consisting of natural rubber, styrene-butadiene rubber, acrylonitrile-butadiene rubber, butyl rubber, chloroprene type synthetic rubber, acryl rubber, urethane rubber, polybutadiene rubber, ethylene-propylene rubber, ethylene-propylene terpolymer, polyether rubber, polybutene-1 rubber, and ethylene-butadiene rubber.

3. The multi-layered container of claim 2, wherein said gum rubber compound is selected from the group consisting of ethylene-propylene rubber and ethylene-propylene terpolymers.

4. The multi-layered container of claim 1, wherein said intermediate layer comprises from about 50 to 65% by weight of said ethylene-vinyl acetate copolymer grafted with an unsaturated glycidyl compound, from about 20 to 30% by weight of said polyolefin, and from about 15 to about 25% by weight of said gum rubber compound.

5. The multi-layered container of claim 1, wherein said outer layer includes a compound selected from the group consisting of inorganic fillers and fiber compounds.

* * * * *

UNITED STATES PATENT AND TRADEMARK OFFICE
CERTIFICATE OF CORRECTION

PATENT NO. : 4,497,856
DATED : February 5, 1985
INVENTOR(S) : Iwasawa et al.

It is certified that error appears in the above-identified patent and that said Letters Patent are hereby corrected as shown below:

Column 1, line 30, after "containers" insert a comma.

Column 2, line 11, "resin" should read -- resins --.

Column 2, line 23, after "so that" insert the phrase -- from the economic viewpoint alone --.

Column 4, line 66, "oleins" should read -- olefins --.

Signed and Sealed this

Twentieth Day of August 1985

[SEAL]

Attest:

DONALD J. QUIGG

*Attesting Officer*     *Acting Commissioner of Patents and Trademarks*